US011190305B1

(12) United States Patent
Sun et al.

(10) Patent No.: US 11,190,305 B1
(45) Date of Patent: Nov. 30, 2021

(54) SYSTEMS AND METHODS FOR INTRODUCING TIME DIVERSITY IN WIFI TRANSMISSIONS

(71) Applicant: Marvell International Ltd., Hamilton (BM)

(72) Inventors: Yakun Sun, Sunnyvale, CA (US); Hongyuan Zhang, Fremont, CA (US); Liwen Chu, San Ramon, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 346 days.

(21) Appl. No.: 16/194,139

(22) Filed: Nov. 16, 2018

Related U.S. Application Data

(63) Continuation of application No. 14/582,568, filed on Dec. 24, 2014, now Pat. No. 10,135,582.

(60) Provisional application No. 61/920,949, filed on Dec. 26, 2013, provisional application No. 61/935,206, filed on Feb. 3, 2014.

(51) Int. Cl.
| | |
|---|---|
| *H04L 1/18* | (2006.01) |
| *H04L 1/08* | (2006.01) |
| *H04B 7/06* | (2006.01) |

(52) U.S. Cl.
CPC .............. *H04L 1/1893* (2013.01); *H04L 1/08* (2013.01); *H04B 7/0669* (2013.01)

(58) Field of Classification Search
CPC ........ H04L 1/1893; H04L 1/08; H04B 7/0669
See application file for complete search history.

(56) References Cited

U.S. PATENT DOCUMENTS

| | | | |
|---|---|---|---|
| 9,634,802 B2 | 4/2017 | Yerramalli et al. | |
| 2006/0107167 A1* | 5/2006 | Jeong | H04L 1/0625 714/748 |
| 2006/0203935 A1 | 9/2006 | Li et al. | |
| 2008/0273614 A1 | 11/2008 | Heegard et al. | |
| 2009/0219870 A1 | 9/2009 | Wengerter et al. | |
| 2009/0219878 A1 | 9/2009 | Oh et al. | |
| 2011/0119947 A1 | 5/2011 | Pacheco Da Cunha | |
| 2011/0126072 A1* | 5/2011 | Yoshimoto | H04L 1/1893 714/751 |
| 2012/0051447 A1* | 3/2012 | Qi | H04L 1/0009 375/259 |
| 2012/0069804 A1* | 3/2012 | Kim | H04L 5/0053 370/329 |

(Continued)

OTHER PUBLICATIONS

"Part 11: Wireless LAN Medium Access Control (MAC) and Physical Layer (PHY) Specifications," IEEE Computer Society (2012), 2793 pages.

*Primary Examiner* — Charles C Jiang
*Assistant Examiner* — Voster Preval

(57) ABSTRACT

Systems and methods are provided for introducing time diversity in a transmitter. The systems and methods may include receiving, at the transmitter, a request from a receiver to retransmit data. The systems and methods may further include receiving an input of data corresponding to the data requested for retransmission at a first transmitter block. The systems and methods may further include operating on the signals using the first transmitter block in at least one of a first mode and a second mode, such that an output of signals from the first transmitter block is dependent on a time-varying function and corresponds to the data requested by the receiver for retransmission.

10 Claims, 7 Drawing Sheets

(56) References Cited

U.S. PATENT DOCUMENTS

| | | | |
|---|---|---|---|
| 2013/0142276 A1* | 6/2013 | Baik | H04L 5/00 |
| | | | 375/295 |
| 2013/0235828 A1* | 9/2013 | Sun | H04L 1/0625 |
| | | | 370/329 |
| 2014/0112417 A1 | 4/2014 | Miyazaki | |
| 2014/0269460 A1 | 9/2014 | Papasakellariou et al. | |
| 2015/0131516 A1 | 5/2015 | Zhang | |
| 2016/0119947 A1 | 4/2016 | Park et al. | |
| 2016/0261371 A1* | 9/2016 | Klenner | H03M 13/1185 |
| 2017/0230149 A1* | 8/2017 | Wang | H04L 1/1819 |

\* cited by examiner

SYSTEMS AND METHODS FOR INTRODUCING TIME DIVERSITY IN WIFI TRANSMISSIONS

CROSS-REFERENCE TO RELATED APPLICATION

This application is a continuation of U.S. patent application Ser. No. 14/582,568, filed Dec. 24, 2014, which claims the benefit of U.S. Provisional Patent Application Nos. 61/920,949, filed Dec. 26, 2013 and 61/935,206, filed Feb. 3, 2014, each of which is hereby incorporated by reference herein in its entirety.

FIELD OF USE

This disclosure relates to the wireless data transfer systems of the type that transmit data over slowly varying wireless channels, such as those found in indoor environments. For example, IEEE 802.11/WiFi systems are commonly used to provide wireless transfer of data in indoor environments.

BACKGROUND OF THE DISCLOSURE

In systems of the type described above, packets are prone to transmission errors due to destructive interference caused by the multipath propagation of the signal from the transmitter to the receiver. Currently, many such systems, including systems implementing IEEE 802.11/WiFi, use retransmission methods to ensure that the data contained in the lost packets is received successfully at the receiver. In other words, these systems attempt to take advantage of multiple transmissions of the same packet, a concept known as time diversity.

One such retransmission method is known as Automatic Repeat reQuest (ARQ), in which the receiver, upon failing to decode a packet, transmits a request to the transmitter to resend the packet. To receive the packet successfully, the receiver relies on the diminishing probability of error over multiple attempts. As another example, when using the HARQ retransmission method, the receiver transmits a request to the transmitter to resend an un-decoded packet in a manner similar to that of ARQ, but additionally combines the previously received packet with the resent packet to improve the probability of decoding the data in the packet.

Due to the frequency-selective nature of slow-varying channels, such as WiFi channels, wherein a channel may remain in a deep fade for a considerable amount of time, the probability of error in each ARQ retransmission decays at a very slow rate when using a retransmission method. This is caused by a given un-decoded packet being retransmitted using the same deep-fading channel. In the case of HARQ transmissions, multiple transmissions are still required to cover the packets affected by a deep fade.

In order to improve the efficiency of retransmissions, it is therefore desirable for the channels to change over time. However, the static nature of wireless channels in certain systems, such as WiFi systems operating in an indoor environment, precludes such systems from benefiting from retransmissions in an efficient manner.

SUMMARY

In accordance with an embodiment of the present disclosure, a method is provided for introducing time diversity in a transmitter. The method may include receiving, at the transmitter, a request from a receiver to retransmit data, and in response to receiving the request, receiving an input of signals at a first transmitter block corresponding to the data requested for retransmission. The method may further include operating on the signals using the first transmitter block in at least one of a first mode and a second mode, such that an output of signals from the first transmitter block is dependent on a time-varying function and corresponds to the data requested by the receiver for retransmission.

In some implementations, the input of signals may include at least one of a grouping of bits and a grouping of symbols.

In some implementations, operating on the signals using the first transmitter block in the first mode may further include re-ordering of the signals according to the time-varying function and sending the signals to a second transmitter block.

In some implementations, operating on the signals using the first mode may further include determining a plurality of transmitter blocks that are capable of sending signals to the first transmitter block, and ordering the plurality of transmitter blocks that are capable of sending signals to the first transmitter block according to the time-varying function, The time-varying function may operate by determining an initial ordering of the plurality of transmitter blocks at a first instance of time. In some implementations, at least one of shifting the ordering of the plurality of transmitter blocks at a second instance of time, and reversing the ordering of the plurality of transmitter blocks at a second instance of time may be accomplished. Further, the signals may be ordered based on the order of the corresponding transmitter block in the ordering of the plurality of the transmitter blocks.

In some implementations, operating on the signals using the first transmitter block in the second mode may include determining a second transmitter block for receiving the signals according to the time-varying function and sending the signals to the second transmitter block.

In some implementations, determining a second transmitter block for receiving signals while in the second mode may include determining a plurality of transmitter blocks that are capable of receiving the signals and ordering the plurality of transmitter blocks capable of receiving the signals according to the time-varying function. The time-varying function may operate by determining an initial ordering of the plurality of transmitter blocks at a first instance of time and at least one of: shifting the ordering of the plurality of transmitter blocks at a second instance of time, and reversing the ordering of the plurality of transmitter blocks at a second instance of time. Further, a transmitter block may be selected from the ordered plurality of transmitter blocks.

In some implementations, the first transmitter block may be one of a stream parser, encoder parser, a frequency segment parser, a BCC bit interleaver, a subcarrier mapper, and a CSD block.

In some implementations, the first transmitter block may be a BCC bit interleaver. Further, operating on the signals using the BCC bit interleaver may be performed using at least one of a bit-to-subcarrier permutation layer, a bit-to-modulation permutation layer, a bit-to-frequency rotation layer, and a time-varying interleaver layer.

In some implementations, the transmitter block may be a subcarrier mapper. Further, operating on the signals using the subcarrier mapper may be performed using at least one of a time-varying permutation of symbol-to-subcarrier mapping block and a time-varying frequency domain interleaver block.

In some implementations, the time-varying function may introduce a time dependence using at least one of a transmission count, a retransmission count, an OFDM symbol count, a configuration by a higher layer, and by using signaling.

In accordance with another embodiment of the present disclosure, a system is provided for introducing time diversity in a transmitter. The system may include a transmitter configured to receive a request from a receiver to retransmit data to the receiver. Further, the system may include control circuitry configured to, in response to such a request, receive an input of signals at a first transmitter block corresponding to the data requested for retransmission, and operate on the signals using the first transmitter block in at least one of a first mode and a second mode, such that an output of signals from the first transmitter block is dependent on a time-varying function and corresponds to the data requested by the receiver for retransmission.

In some implementations, the system may include control circuitry configured to, when operating in the first mode, re-order the signals according to the time-varying function and send the signals to a second transmitter block.

In some implementations, the system may include control circuitry configured to, when re-ordering the signals according to the time-varying function while in a first mode, determine a plurality of transmitter blocks that are capable of sending signals to the first transmitter block. Further, the control circuitry may order the plurality of transmitter blocks that are capable of sending signals to the first transmitter block according to the time-varying function, wherein the time-varying function operates by determining an initial ordering of the plurality of transmitter blocks at a first instance of time and at least one of: shifting the ordering of the plurality of transmitter blocks at a second instance of time, and reversing the ordering of the plurality of transmitter blocks at a second instance of time. In some implementations, the control circuitry, in response to the ordering of the plurality of the transmitter blocks, may order the signals based on the order of the corresponding transmitter block in the ordering of the plurality of the transmitter blocks.

In some implementations, the system may include control circuitry configured to, when operating on the signals using the first transmitter block in the second mode, determine a second transmitter block for receiving the signals according to the time-varying function, and send the signals to the second transmitter block.

In some implementations, the system may include control circuitry configured to determine the second transmitter block for receiving the signals according to the time-varying function while in the second mode. The control circuitry may determine a plurality of transmitter blocks that are capable of receiving the signals, and order the plurality of transmitter blocks capable of receiving the signals according to the time-varying function, wherein the time-varying function operates by determining an initial ordering of the plurality of transmitter blocks at a first instance of time and at least one of: shifting the ordering of the plurality of transmitter blocks at a second instance of time, and reversing the ordering of the plurality of transmitter blocks at a second instance of time. Further, the control circuitry may, in response to the ordering, select a transmitter block from the ordered plurality of transmitter blocks.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

This disclosure describes methods and systems for introducing time diversity into a wireless system transmission. According to this disclosure, time diversity can be introduced into the transmission by modifying existing blocks of a wireless transmitter, and by adding new blocks or layers specifically designed to provide time diversity functionality. Any or all of the blocks or layers described in the disclosure can be implemented by software instructions encoded on computer-readable media.

Figure 1:
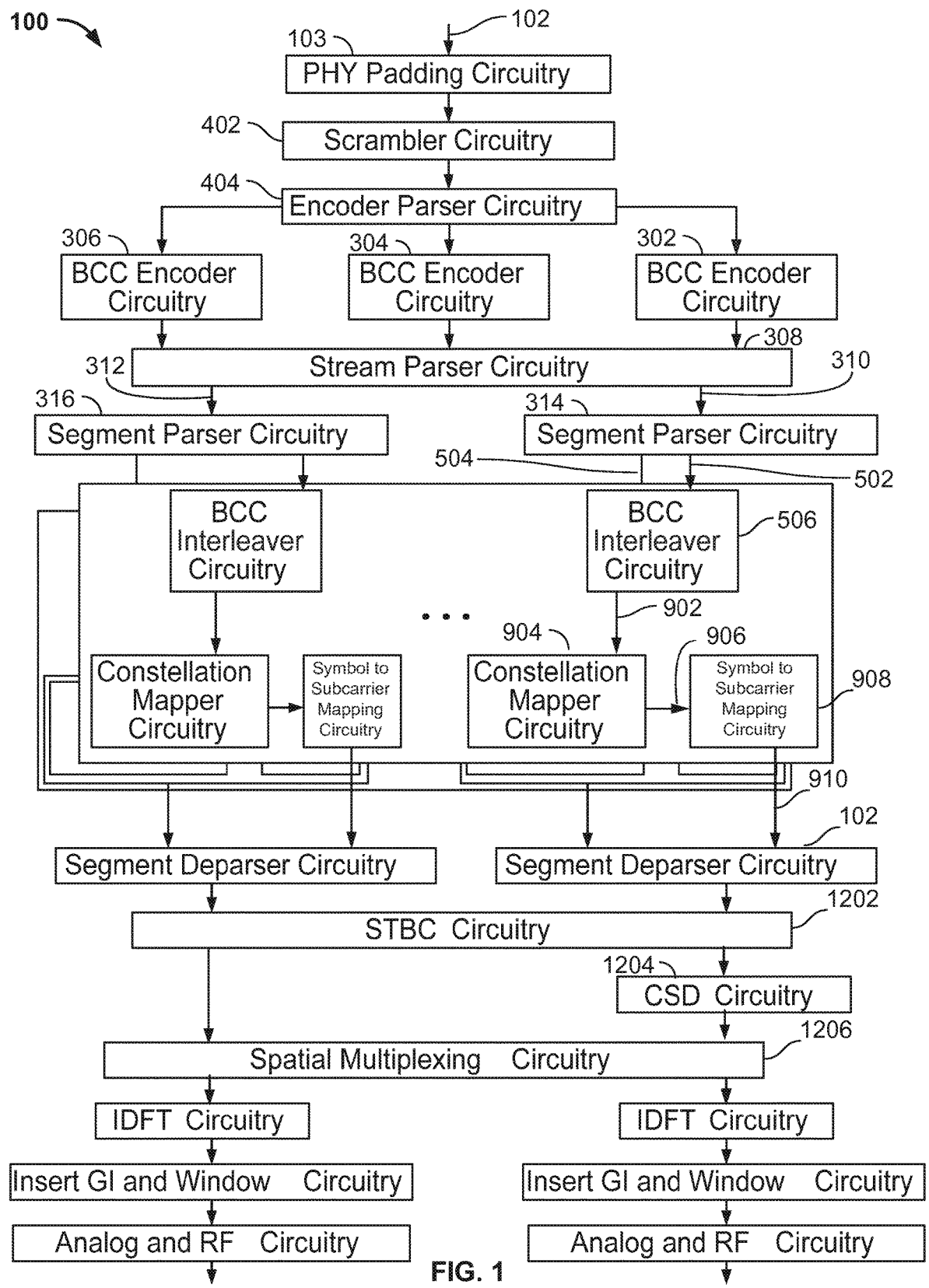
FIG. 1 shows a schematic representation of the relevant blocks of a WiFi transmitter in accordance with an embodiment of the present disclosure.

FIG. 1 depicts a schematic representation of an example embodiment of a wireless transmitter. In this embodiment, a packet of data arrives from the media access control (MAC) layer input 102 into the physical layer (PHY) padding block 103. After processing by 103, the packet enters the scrambler block 402, which forwards the packet to the encoder parser 404, which then splits the bit sequence of the packet data into encoders 302, 304, and 306. Each of 302, 304, and 306 then transmits the packet data to stream parser 308, which maps the encoded bits of the packet data to spatial stream 310 and spatial stream 312. The process follows two parallel paths. For purposes of clarity, only one of the paths is described in detail, with the understanding that, taken independently, the second path starting with the output of 312 is functionally identical to the first path, which starts at the output of 310. Spatial stream 310 provides the packet data to segment parser 314, which splits the packet bits into two 80 MHz segments, segment 502 and segment 504. Again, for purposes of clarity, only one of the subsequent paths following the parsing of the two segments is described. A group of bits is transferred using 502 to a BCC interleaver 506, which interleaves coded bits before modulation. The bits are then sent from 506 to the constellation mapper 904 over encoded bit stream 902. Constellation mapper 904 receives the encoded bits through 902 and outputs a quadrature amplitude modulation (QAM) symbol stream 906, which is then sent to the subcarrier mapper 908, which non-consecutively maps the modulated symbols to subcarriers. Finally, the symbol stream passes through the segment deparser 102, the STBC block 102, and is inputted into the cyclic shift insertion (CSD) block 1204, which introduced frequency-varying phases to increase frequency diversity.

Figure 2:
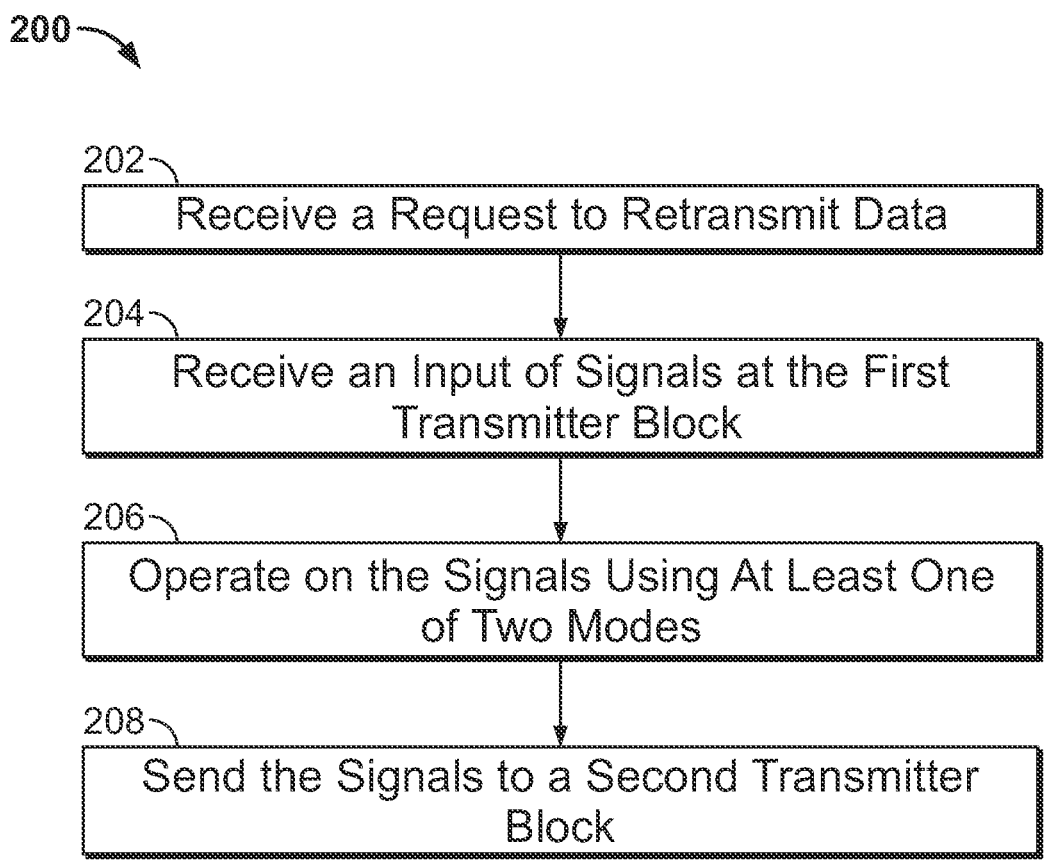
FIG. 2 is a flow diagram of an exemplary method according to the present disclosure.

FIG. 2 depicts a process flow diagram describing the application of time diversity at a block or layer of a wireless transmitter. At 202, the wireless transmitter receives a request from a receiver to retransmit a packet of data. The transmitter retrieves the data from 102. The data, in the form of bits or symbols, collectively referred to as signals, is received at a transmitter block at 204. When operating on the data in accordance with a transmitter block's current function at 206, time diversity may be introduced by operating on the signals in one of two modes. In the first mode, the signals may be re-ordered according to a time-varying function. Alternatively, in a second mode, time diversity may be introduced by determining and ordering a set of transmitter blocks that can receive the current signal according to a time-varying function, and then sending the signals to the transmitters in accordance to the determined ordering. In some embodiments, both modes may be used concurrently in a given block. At 208, the signals are sent to the next transmitter block in the transmitter data flow sequence.

It should be understood that the concept of ordering or re-ordering of any of the bits, symbols, signals, inputs, outputs, or blocks described in this disclosure is not limited to a specific time scale. For example, the ordering can differ over subsequent transmissions or retransmissions of a packet, such that when T equals to 0, the packet or data is sent during a first transmission attempt, and when T equals to 1, the packet or data is sent during a second transmission attempt. As another example, the ordering can be applied over each orthogonal frequency-division multiplexing (OFDM) symbol. The ordering can also vary across time in various manners, for example, a transmission-level time variance may be accomplished every n number of transmissions. Alternatively, the applied ordering can be configured by a higher layer of the transmitter, or by signaling. Finally, it should be understood that the terms time-dependent and time-varying are used interchangeable in this disclosure.

Figure 3:
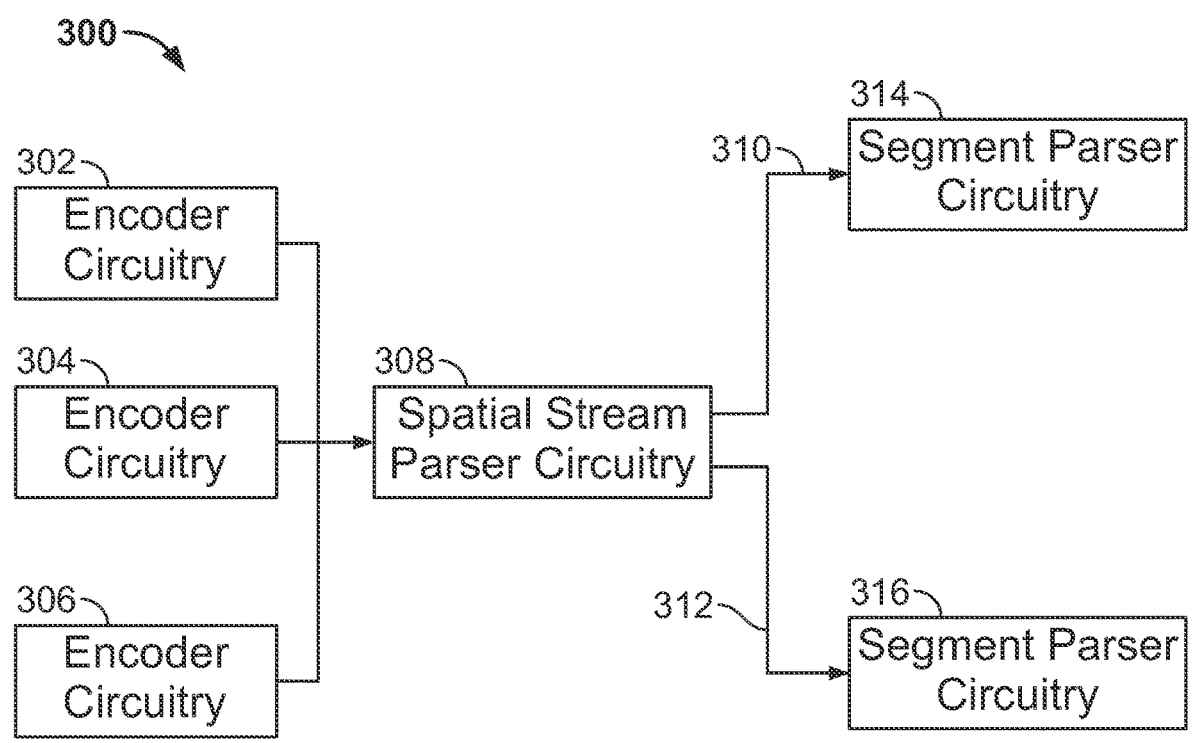
FIG. 3 shows a schematic representation of inputs and outputs of the circuitry of a spatial stream parser in accordance with an embodiment of the present disclosure.

To illustrate an example embodiment of the application of time diversity in a wireless transmitter, reference is now made to FIG. 3, which illustrates a schematic representation of inputs and outputs of the circuitry of a spatial stream parser 308. In the example embodiment described in FIG. 3, encoders 302, 304, and 306 send inputs of bits to the spatial stream parser 308, however, the number of encoders can vary based on the specific embodiment considered. Spatial stream parser 308 assigns the inputs of bits to stream 310 or stream 312, and the streams then send the bits to a segment parser 314 or segment parser 316. Again, in this example embodiment, two segment parsers are present; however, the number of segment parsers can vary based on the specific embodiment considered. In an existing transmitter, the i-th block of bits $y_i^{(j)}$ from encoder j (selected from the set of 302, 304, and 306 in the present embodiment) is sent as stream output $x_k^{iss}$ to spatial stream $i_{ss}$ (selected from the set of 310 and 312 in the present embodiment) according to the ordering defined by the constraints below. $N_{CBPSS}$ is defined as the number of coded bits per symbol per the i-th spatial stream, $N_{SS}$ is defined as number of spatial streams, $N_{ES}$ is defined as number of encoders, $i_{ss}$ defined as the i-th spatial stream, $N_{CBPSS}$ is defined as the number of coded bits per symbol, $N_{BPSC}$ is defined as the number of coded bits per single carrier, k is defined as the index of bits at the output of the first interleaver and s is defined in the equation below.

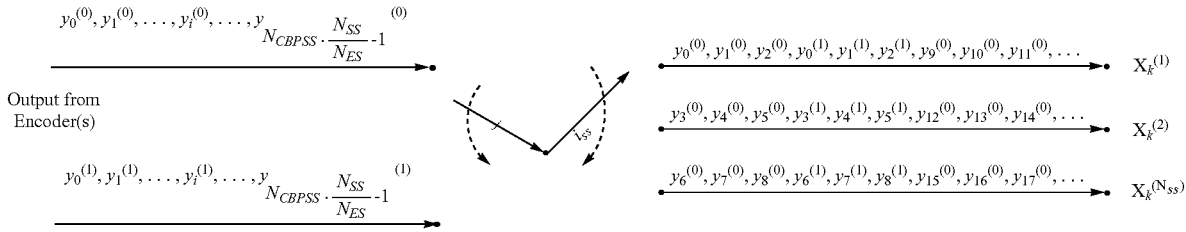

As shown below, the i-th bit block $y_i^{(j)}$ is cyclically selected from the j-th encoder and sent to spatial stream $i_{ss}$ according to a non-time-dependent function:

$$x_k^{iss} = y_i^{(j)} \quad 1 \leq i_{SS} \leq N_{SS}, s = \max\left(1, \frac{N_{BPSCS}}{2}\right)$$

$$j = \left\lfloor \frac{k}{s} \right\rfloor \bmod N_{ES}$$

$$i = (i_{SS} - 1) \cdot s + s \cdot N_{SS} \cdot \left\lfloor \frac{k}{s \cdot N_{ES}} \right\rfloor + k \bmod s$$

Time diversity may be introduced by adding a time dependence to the selection of the bit block input $y_i^{(j)}$ from an encoder j and to the selection of one of the encoders j, where output $x_k^{t(iss,T)}$ is made to be time-dependent by the introduction of time-dependent functions f, f-tilde, and t.

$$x_k^{t(iss,T)} = y_i^{(j)}$$

$$j = f\left(\left\lfloor \frac{k}{s} \right\rfloor \bmod N_{ES}, T\right) = f'\left(\left\lfloor \frac{k}{s} \right\rfloor, T\right) \bmod N_{ES}$$

-continued $$i = (t(i_{SS}, T) - 1) \cdot s + s \cdot N_{SS} \cdot \left\lfloor \frac{k}{s \cdot N_{ES}} \right\rfloor + k \bmod s$$

Accordingly, the ordering blocks is time-dependent, as shown below:

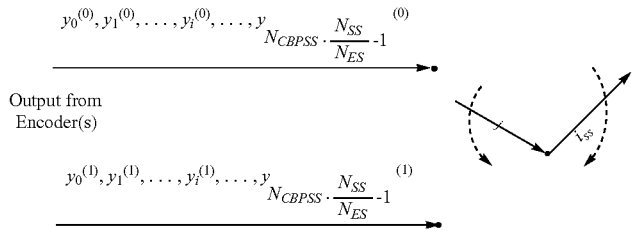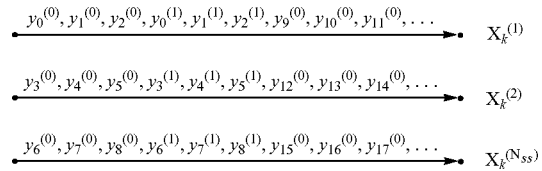

The time varying of spatial stream ordering can be selected out of a finite set, defined as follows.

$$\{t(1,T), \ldots, t(N_{SS},T)\} \in \{\Pi_1, \Pi_2, \ldots \Pi_L\} L \leq N_{SS}!$$

In the constraint, L is defined as the number of orderings used by the system. This set of orderings can be the subset of all possible $N_{ss}$ combinations. For example, if there are two encoders ($N_{ss}$ is equal to 2), the possible set of spatial stream orderings becomes:

$$\Pi_1 = \{1,2\}, \Pi_2 = \{2,1\}$$

In this example, the ordering is selected as $\Pi_1$ at T=0, and as $\Pi_2$ at T=1. In other words, at time T equal to 0, the first spatial stream is stream 1 (310), while the second spatial stream is stream 2 (312). Meanwhile, at time T equal to 1, the first spatial stream is stream 2 (312), while the second spatial stream is stream 1 (310).

$$t(1,0)=1, t(2,0)=2$$

$$(1,1)=2, t(2,1)=1$$

An example of time varying the spatial stream ordering is to cyclically shift the streams by introducing the following function t.

$$t(i_{SS},T)=(i_{SS}-1+\Delta_{SS} \cdot T) \bmod N_{SS}+1 \; T=0,1, \ldots, N_{retransmission}$$

In the example above, $N_{retransmission}$ is defined as the total number of retransmission sent. As an additional example, the spatial stream ordering can be made time-varying by flipping the order of the streams across time. That is, the time-dependent function t can be defined as:

$$t(i_{SS},2T)=i_{SS} t(i_{SS},2T+1)=N_{SS}-i_{SS}+1$$

To introduce time diversity, a time-dependent encoder stream ordering can also be selected out of a finite set of orderings. For a given number of encoders in a system $N_{ES}$, the ordering is selected out of the set defined as:

$$\{f(0,T), \ldots, t(N_{ES}-1,T)\} \in \{\Pi'_1, \Pi'_2, \ldots \Pi'_L\} \; L \leq N_{ES}!$$

For example, if there are two encoders ($N_{ES}$ is equal to 2), the possible set of spatial stream orderings becomes:

$$\Pi'_1 = \{1,2\}, \Pi'_2 = \{2,1\}$$

An example of time varying the encoder ordering is to cyclically shift the streams from the encoders, with the introduction of function f, defined as:

$$f(k,T)=(k+\Delta_{ES} \cdot T) \bmod N_{ES}$$

Here, $\Delta_{ES}$ is defined as the offset for the cyclical shift per encoder. As another example, the spatial stream ordering can be made time-varying by flipping the order of the encoder streams across time with the introduction of function f, defined as:

$$f(k,2T)=k f(k,2T+1)=N_{ES}-k-1$$

For certain number of coded bits per symbol that cannot be divided into blocks of bits for each stream and encoder, additional bits are parsed separately. For example, in an existing IEEE 802.11ac transmission using a 160 MHz bandwidth, with five or seven spatial streams ($N_{ss}$ is equal to 5 or 7) and with a modulation and coding set (MCS) set to a value 5 or 6, an encoder j and an bit block i are currently selected as follows:

$$j = \begin{cases} \left\lfloor \frac{k}{s} \right\rfloor \bmod N_{ES} & k = 0, \ldots, N_{Block} \cdot N_{ES} \cdot s - 1 \\ \left\lfloor \frac{L}{M} \right\rfloor & k = N_{Block} \cdot N_{ES} \cdot s, \ldots, N_{CBPSS} - 1 \end{cases}$$

$$i = \begin{cases} (i_{SS}-1) \cdot s + s \cdot N_{SS} \cdot & k = 0, \ldots, N_{Block} \cdot N_{ES} \cdot \\ \left\lfloor \frac{k}{s \cdot N_{ES}} \right\rfloor + k \bmod s & s - 1 \\ L \bmod M + N_{Block} \cdot s \cdot N_{SS} + & k = N_{Block} \cdot N_{ES} \cdot s, \ldots, \\ k \bmod s & N_{CBPSS} - 1 \end{cases}$$

$$N_{Block} = \left\lfloor \frac{N_{CBPS}}{N_{ES} \cdot N_{SS} \cdot s} \right\rfloor$$

$$M = \frac{N_{CBPS} - N_{Block} \cdot N_{ES} \cdot N_{SS} \cdot s}{N_{ES} \cdot s}$$

In the equations above, $N_{Block}$ is defined as the number of blocks, and s is defined in the equation below. The parser will operate in an identical manner as the parser detailed in the previous examples for the first $N_{Block} \times N_{ES} \times s$ bits, and the selection of the blocks of bits originating from an encoder j and selection of the i-th spatial stream is made to be time-dependent by the introduction of time-dependent term function f, f-tilde, t, and t-tilde.

$$j = \begin{cases} f\left(\left\lfloor \frac{k}{s} \right\rfloor \bmod N_{ES}, T\right) & k = 0, \ldots, N_{Block} \cdot N_{ES} \cdot s - 1 \\ \tilde{f}\left(\left\lfloor \frac{L}{M} \right\rfloor, T\right) & k = N_{Block} \cdot N_{ES} \cdot s, \ldots, N_{CBPSS} - 1 \end{cases}$$

-continued $$i = \begin{cases} t(i_{SS}-1,T) \cdot s + s \cdot N_{SS}, & k=0,\ldots,N_{Block} \cdot N_{ES} \cdot \\ \left\lfloor \dfrac{k}{s \cdot N_{ES}} \right\rfloor + k \bmod s & s-1 \\ \tilde{i}(L \bmod M, T) + N_{Block} \cdot & k = N_{Block} \cdot N_{ES} \cdot s, \ldots, \\ s \cdot N_{SS} + k \bmod s & N_{CBPSS}-1 \end{cases}$$

To simplify the implementation, the f function and t function can be used in place of the f-tilde and t-tilde function, respectively.

Figure 4:
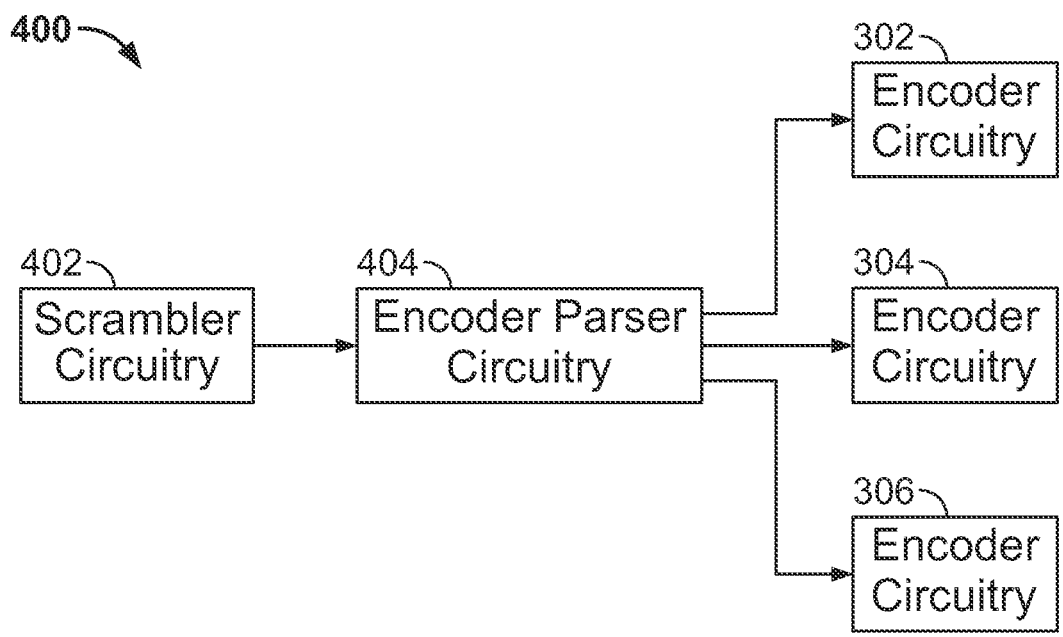
FIG. 4 shows a schematic representation of inputs and outputs of the circuitry of an encoder parser in accordance with an embodiment of the present disclosure.

Another example embodiment of the application of time diversity in a wireless transmitter is shown in FIG. 4, which illustrates a schematic representation of inputs and outputs of a BCC encoder parser 404. A scrambler block 402 provides a bit sequence into the encoder parser 404, which then transmits the bits to one of the BCC encoders 302, 304, 306. Three encoders are present in the example embodiment; however, the number of encoders may vary based on the specific implementation.

Currently, in cases where there is more than one BCC encoder present, the i-th bit in the j-th encoder is selected from the bit sequence b by the following function. $N_{DPBS}$ is defined as the number of data bits per symbol, and $N_{SYM}$ is defined as the number of OFDM symbols.

$$x_i^{(j)} = \begin{cases} b_{N_{ES} \cdot i + j} & 0 \le i < N_{SYM} \dfrac{N_{DPBS}}{N_{ES}} - 6 \\ 0 & N_{SYM} \dfrac{N_{DPBS}}{N_{ES}} - 6 \le i \le N_{SYM} \dfrac{N_{DPBS}}{N_{ES}} \end{cases}$$

$$0 \le j \le N_{ES} - 1$$

A time-varying info bit to encoder parser changes the bit-to-encoder parsing every transmission or every retransmission.

$$x_j^{(t(j,T))} = \begin{cases} b_{N_{ES} \cdot i + j} & 0 \le i < N_{SYM} \dfrac{N_{DPBS}}{N_{ES}} - 6 \\ 0 & N_{SYM} \dfrac{N_{DPBS}}{N_{ES}} - 6 \le i \le N_{SYM} \dfrac{N_{DPBS}}{N_{ES}} \end{cases}$$

The bit encoder parsing can be selected out of a finite set of orderings.

$$\{t(1,T),\ldots,t(N_{ES},T)\} \in \{\Pi''_1, \Pi''_2, \ldots \Pi''_L\} L \le N_{ES}!$$

For example, when two encoders are present, the sets may be defined as follows:

$$\Pi''_1 = \{1,2\}, \Pi''_2 = \{2,1\}$$

Similarly to the case of the stream parser, the ordering of encoders can by cyclically shifted across time using function t defined as:

$$t(j,T) = (j + \Delta_{ES} \cdot T) \bmod N_{ES} \quad T=0,1,\ldots,N_{retransmission}.$$

As another example, and similarly to the case of the stream parser, the ordering of encoders can be flipped at each time, using the function t defined as:

$$t(j,2T) = j \quad t(j,2T+1) = N_{ES} - j - 1$$

Figure 5:
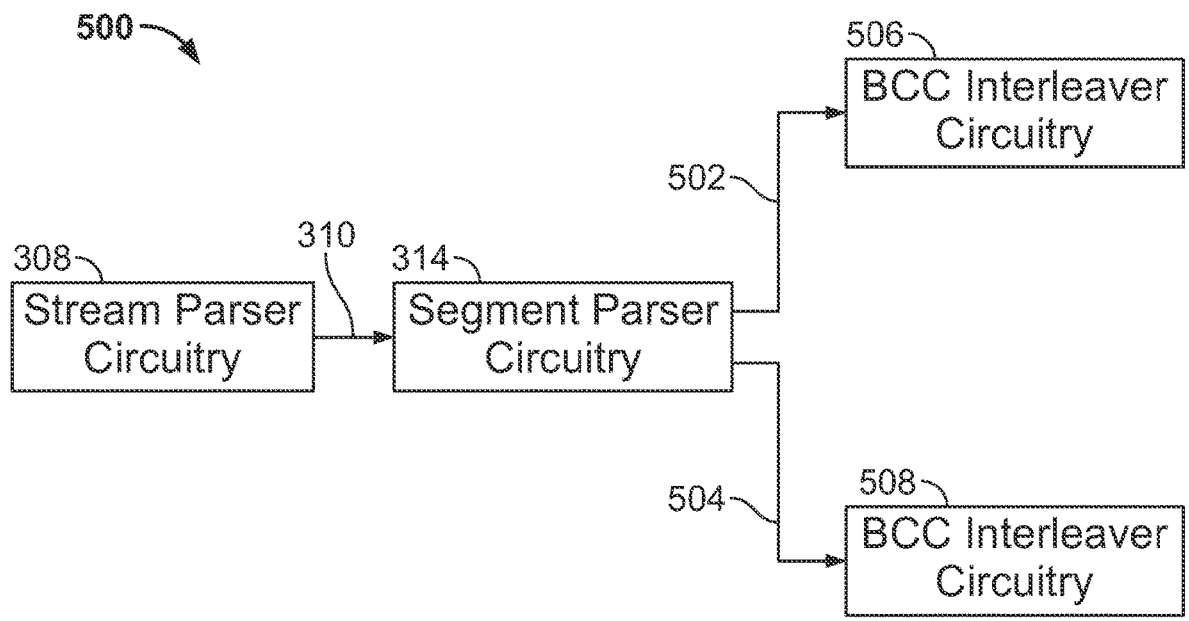
FIG. 5 shows a schematic representation of inputs and outputs of the circuitry of a segment parser in accordance with an embodiment of the present disclosure.

Yet another example embodiment of the application of time diversity in a wireless transmitter is shown in FIG. 5, which illustrates a schematic representation of inputs and outputs of a frequency segment parser 314 of a transmitter using a 160 MHz or 80+80 MHz bandwidth. Such a transmitter divides the transmission into two 80 MHz frequency segments 502 and 504. It should be understood that this is simply an illustrative bandwidth and segmentation scenario, and that the example can be extended to embodiments that operate using other types of bandwidth and frequency segmentation.

The bit blocks of each spatial stream 310 and 312 are allocated into two frequency segments. For clarity, only 310 is shown in FIG. 5. A given bit block from 314 is sent to segment k according to the function below. Here, $x_j$ is defined as the bit sequence at output of stream parser, 1 is defined as the index of first and second 80 MHz segment, where 1 may be equal to 0 or 1, and k is defined as the bit index of bit sequence in each segment.

$$y_{k,i} = x_j$$

$$j = \begin{cases} 2s \cdot N_{ES} \left\lfloor \dfrac{k}{s \cdot N_{ES}} \right\rfloor + l \cdot s \cdot N_{ES} + & 0 \le k < \left\lfloor \dfrac{N_{CBPSS}}{2s \cdot N_{ES}} \right\rfloor \cdot s \cdot N_{ES} \\ k \bmod (s \cdot N_{ES}) & \\ 2s \cdot N_{ES} \left\lfloor \dfrac{k}{s \cdot N_{ES}} \right\rfloor + l \cdot s \cdot N_{ES} + & \left\lfloor \dfrac{N_{CBPSS}}{2s \cdot N_{ES}} \right\rfloor \cdot s \cdot N_{ES} \le i \le \\ k \bmod s + \left\lfloor \dfrac{k \bmod (s \cdot N_{ES})}{s} \right\rfloor & \dfrac{N_{CBPSS}}{2} - 1 \end{cases}$$

In order to take advantage of time diversity in the segment parser, the segment ordering may change across time.

$$y_{k,t(l,T)} = x_j$$

A possible embodiment that alternates the order of the segments during each transmission can be used to implement time diversity. For example, at time 2T, the segment 502 is selected to be the first segment to receive a block of bits, and 504 is selected to be the second segment to receive a block of bits. At time 2T+1, 504 is selected to be the first segment to receive a block of bits, and 502 is selected to be the second segment to receive a block of bits.

Figure 6:
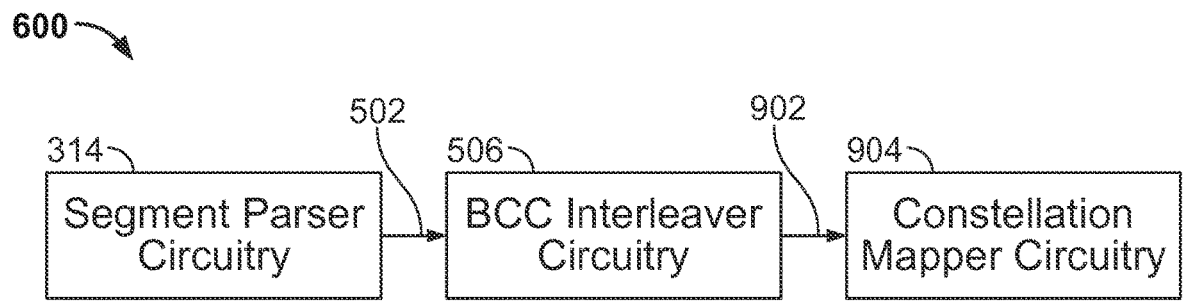
FIG. 6 shows a schematic representation of inputs and outputs of the circuitry of a binary convolutional coding (BCC) interleaver in accordance with an embodiment of the present disclosure.
Figure 7:
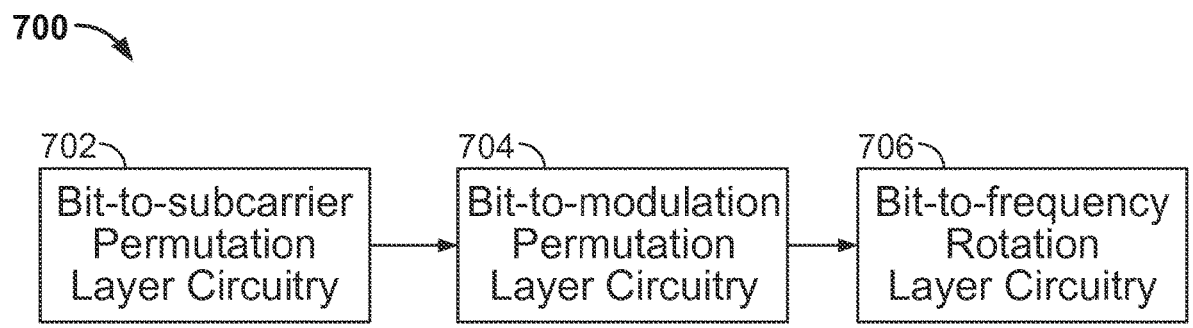
FIG. 7 shows a schematic representation of the layers of the circuitry of a BCC interleaver in accordance with an embodiment of the present disclosure.
Figure 8:
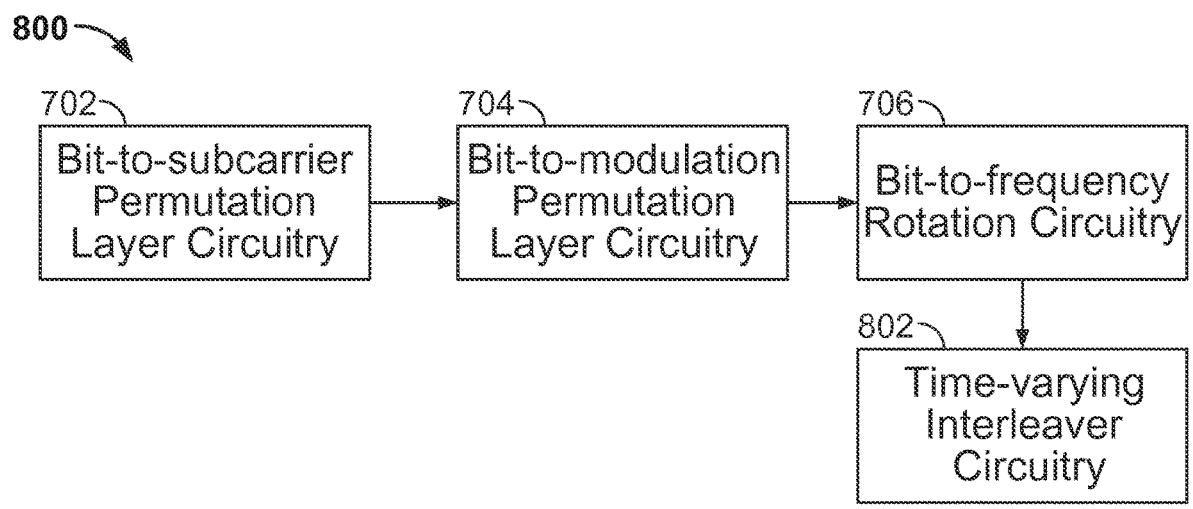
FIG. 8 shows a schematic representation of the layers of the circuitry of a BCC interleaver with an additional time-varying interleaver layer circuitry in accordance with an embodiment of the present disclosure.

Another example embodiment of the application of time diversity in a wireless transmitter is shown in FIG. 7 and FIG. 8, which illustrate schematics of the layers of two BCC interleavers. A schematic of the inputs and outputs of an existing BCC interleaver is shown in FIG. 6. Currently, wireless transmission methods such as WiFi use three layers of permutation to interleave encoded bits for each spatial stream. The permutation is performed in the same manner per every OFDM symbol, and inherently, per each transmission. To counteract this, time diversity may be introduced into the BCC bit interleaver. For example, time dependency can be introduced into any combination of the layers 702, 704, and 706 depicted in FIG. 7. As another example, time dependency may be introduced into the BCC bit interleaver by adding a new time-varying interleaver layer 802, depicted in FIG. 8. Both example embodiments are described in further detail below.

Returning to the example in which time dependency is introduced into any combination of the layers 702, 704, and 706 depicted in FIG. 7, the first layer that can be used to implement time diversity is the bit-to-subcarrier permutation layer 702. This permutation layer spreads the bits over a frequency. For example, upon transmission from the segment parser 314, bits may be written, column by column (vertically), into the layer, and they may be read out and forwarded to the bit-to-modulation permutation layer 702, row by row (horizontally). The output block of bits from 702 $w_k^{iss}$ is as follows:

$$w_k^{iss} = x_i^{iss}$$

$$i = N_{ROW} \cdot (k \bmod N_{COL}) + \left\lfloor \frac{k}{N_{COL}} \right\rfloor$$

$N_{COL}$ is defined to be the number of columns in the interleaving procedure. The bit-to-subcarrier permutation layer 702 can be made time-dependent. For example, a random and prefixed table of mappings can be introduced, where the block of bits $w_k^{iss}$ is determined as follows:

$$w_k^{iss} = x_{i(T)}^{iss}$$

$$i(T) = \left( N_{ROW} \cdot (k \bmod N_{COL}) + f^{(iss)}\left( \left\lfloor \frac{k}{N_{COL}} \right\rfloor, T \right) \right) \bmod N_{SD}$$

Here, $N_{SD}$ is the number of complex data numbers per spatial stream per OFDM symbol. As another example, the rows may be shifted cyclically.

$$i(T) = \left( N_{ROW} \cdot (k \bmod N_{COL}) + \left\lfloor \frac{k}{N_{COL}} \right\rfloor + \Delta_{ROW}^{iss} \cdot T \right) \bmod N_{SD}$$

$$i(T) = N_{ROW} \cdot (k \bmod N_{COL}) + \left( \left\lfloor \frac{k}{N_{COL}} \right\rfloor + \Delta_{ROW}^{iss} \cdot T \right) \bmod N_{ROW}$$

$\Delta^{iss}_{ROW}$ is defined as the offset of rows for the $i_{ss}$-th stream in the interleaving procedure. Finally, as a third example, the order of the rows can be flipped in an alternating manner during each transmission.

$$i(2T) = N_{ROW} \cdot (k \bmod N_{COL}) + \left\lfloor \frac{k}{N_{COL}} \right\rfloor$$

$$i(2T+1) = N_{ROW} \cdot (k \bmod N_{COL}) + \left( N_{ROW} - 1 - \left\lfloor \frac{k}{N_{COL}} \right\rfloor \right) \bmod N_{ROW}$$

Upon processing the bits in 702, the bits are sent to 704. This layer randomizes the reliability of coded bits in the modulated symbols. The output block of bits from layer 704 $y_k^{iss}$ is as follows:

$$y_k^{iss} = w_j^{iss}$$

$$j = s \cdot \left\lfloor \frac{k}{s} \right\rfloor + \left( k + N_{CBPSSI} - \left\lfloor \frac{N_{COL} \cdot k}{N_{CBPSSI}} \right\rfloor \right) \bmod s$$

$N_{CBPSSI}$ is equal to $N_{CBPSS}$ for 20, 40, and 80 MHz, and $N_{CBPSSI}$ is equal to $N_{CBPSS}$ divided by 2, for 160 and 80+80 MHz cases. Time diversity can also be introduced into this layer. For example, a time-varying random mapper to least significant bits (LSB) and most significant bits (MSB) can be introduced, where the next block of bits $y_k^{iss}$ is defined as follows:

$$y_k^{iss} = w_{j(T)}^{iss}$$

For example, a time-varying random mapper to LSB/MSB can be defined as $$j(T) = s \cdot \left\lfloor \frac{k}{s} \right\rfloor + f\left( k + N_{CBPSSI} - \left\lfloor \frac{N_{COL} \cdot k}{N_{CBPSSI}} \right\rfloor, T \right) \bmod s$$

As another example, a cyclic shift can be introduced over time.

$$j(T) = s \cdot \left\lfloor \frac{k}{s} \right\rfloor + \left( k + N_{CBPSSI} - \left\lfloor \frac{N_{COL} \cdot k}{N_{CBPSSI}} \right\rfloor + \Delta_{Mod}^{iss} \cdot T \right) \bmod s$$

Finally, the LSB to MSB can be flipped alternatively for each transmission.

$$j(2T) = s \cdot \left\lfloor \frac{k}{s} \right\rfloor + \left( k + N_{CBPSSI} - \left\lfloor \frac{N_{COL} \cdot k}{N_{CBPSSI}} \right\rfloor \right) \bmod s$$

$$j(2T+1) = s \cdot \left\lfloor \frac{k}{s} \right\rfloor + s - 1 - \left( k + N_{CBPSSI} - \left\lfloor \frac{N_{COL} \cdot k}{N_{CBPSSI}} \right\rfloor \right) \bmod s$$

Upon processing the bits in 704, the bits are processed by the bit-to-frequency rotation layer 706. In 706, the bits are cyclically shifted over frequency for each spatial stream per ODFM symbol. The output block of bits from 706 $z_k^{iss}$ is as follows, where r is defined the bit index of output at the second bit interleaver:

$$z_k^{iss} = y_r^{iss}$$

$$r = \begin{cases} \left( k - \left( ((i_{SS}-1) \cdot 2) \bmod 3 + 3 \cdot \left\lfloor \frac{i_{SS}-1}{3} \right\rfloor \right) \cdot N_{ROT} \cdot \right. \\ \left. N_{BPSCS} \right) \bmod N_{CBPSSI} & 2 \leq N_{SS} \leq 4 \\ (k - J(i_{SS}) \cdot N_{ROT} \cdot N_{BPSCS}) \bmod N_{CBPSSI} & N_{SS} > 4 \end{cases}$$

$N_{ROT}$ is defined as the frequency rotation parameter. A time-dependent frequency rotation can be used to introduce time diversity as follows:

$$z_k^{iss} = y_{r(T)}^{iss}$$

The time-dependent frequency rotation may be applied even if there is only one spatial stream ($N_{ss}$ is equal to 1). One possible method of applying a time-dependent frequency rotation is to create a time-dependent ordering of the spatial streams.

$$r(T) =$$

$$\begin{cases} \left( k - \left( ((f(i_{SS},T)-1) \cdot 2) \bmod 3 + 3 \cdot \left\lfloor \frac{f(i_{SS},T)-1}{3} \right\rfloor \right) \cdot N_{ROT} \cdot \right. \\ \left. N_{BPSCS} \right) \bmod N_{CBPSSI} & 1 \leq N_{SS} \leq 4 \\ (k - J(f(i_{SS},T) \cdot N_{ROT} \cdot N_{BPSCS}) \bmod N_{CBPSSI} & N_{SS} > 4 \end{cases}$$

In a special case, the number of spatial streams may be cyclically shifted. Therefore, function f can be defined as:

$$f(i_{SS},T) = (i_{SS} - 1 + \Delta_{SS} \cdot T) \bmod N_{SS,Max}$$

As another example, the time-dependent rotation may be accomplished by frequency shift:

$$r(T) = \begin{cases} \left(k - \left(((i_{SS}-1)\cdot 2)\bmod 3 + 3\cdot \left\lfloor \frac{i_{SS}-1}{3} \right\rfloor\right)\right)\cdot N_{ROT} \cdot & 1 \leq N_{SS} \leq 4 \\ \quad N_{BPSCS} + \Delta_{SS}^{i_{SS}} \cdot T\bigg)\bmod N_{CBPSSI} & \\ (k - J(i_{SS}))\cdot N_{ROT} \cdot N_{BPSCS} + \Delta_{SS}^{i_{SS}} \cdot T\big)\bmod N_{CBPSSI} & N_{SS} > 4 \end{cases}$$

As a third example, both the time-dependent ordering of spatial streams and frequency shift examples above can be combined. Finally, as a fourth example, the order of spatial streams can be flipped alternatively for each transmission.

$$r(2T) = \begin{cases} \left(k - \left(((i_{SS}-1)\cdot 2)\bmod 3 + 3\cdot \left\lfloor \frac{i_{SS}-1}{3} \right\rfloor\right)\right)\cdot N_{ROT} \cdot & 2 \leq N_{SS} \leq 4 \\ \quad N_{BPSCS}\bigg)\bmod N_{CBPSSI} & \\ (k - J(i_{SS}))\cdot N_{ROT} \cdot N_{BPSCS})\bmod N_{CBPSSI} & N_{SS} > 4 \end{cases}$$

$$r(2T) = \begin{cases} \left(k - \left(((N_{SS}-i_{SS})\cdot 2)\bmod 3 + 3\cdot \left\lfloor \frac{N_{SS}-i_{SS}}{3} \right\rfloor\right)\right)\cdot N_{ROT} \cdot & 2 \leq N_{SS} \leq 4 \\ \quad N_{BPSCS}\bigg)\bmod N_{CBPSSI} & \\ (k - J(N_{SS}-i_{SS}-1))\cdot N_{ROT} \cdot N_{BPSCS})\bmod N_{CBPSSI} & N_{SS} > 4 \end{cases}$$

Time-dependent permutations can be applied in arbitrary combinations to 702, 704, and 706. For example, an embodiment of the current invention may include time-dependent permutations in 706 only. As another example, all of 702, 704, and 706 of the current BCC interleaver block 506 may be modified to introduce time-dependent permutations. In addition, the method of time-dependent permutations can vary from one layer of permutation to the next. For example, the parameters $\Delta_{ROW}$, $\Delta_{SS}$ in each time-dependent permutation can be configured individually. The parameters can also be configured individually for each spatial stream, for example, $\Delta_{ROW}^1$ for spatial stream 1, $\Delta_{ROW}^2$ for spatial stream 2, and $\Delta_{ROW}^{N_{SS}}$ for spatial stream $N_{ss}$.

As previously noted, another example embodiment of introducing time diversity into a BCC interleaver is achieved by the addition of a new time-varying interleaver 802 placed after 702, 704, and 706, as depicted in FIG. 8. This additional interleaver can introduce time diversity based on each transmission sent. For example, the interleaver can permute a given block of bits according to function t:

$$t(r, T) = \left(f\left(\left(\left\lfloor \frac{r}{L} \right\rfloor + \Delta_{iniv}^{i_{SS}}\cdot T\right)\bmod \frac{N_{SD}}{L}\right) + p\bmod L\right)\bmod N_{SD}$$

In this example, the function f(m), m=0 through $N_{SD}/L-1$ is a permuted array of {0, L, 2L . . . }

Figure 9:
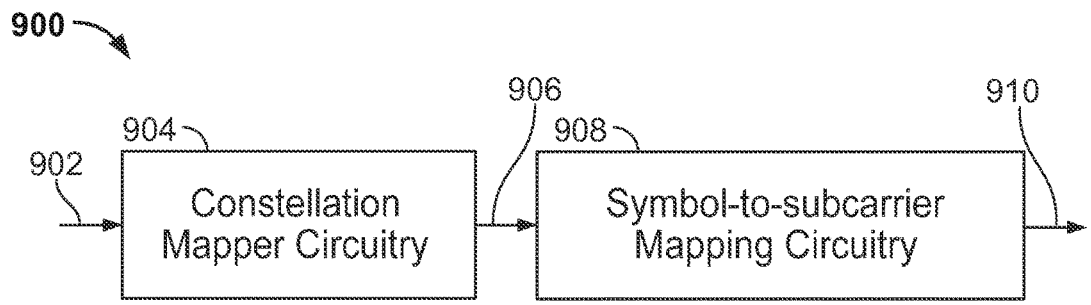
FIG. 9 shows a schematic representation of the inputs and outputs of the circuitry of an existing symbol-to-subcarrier mapper block.
Figure 10:
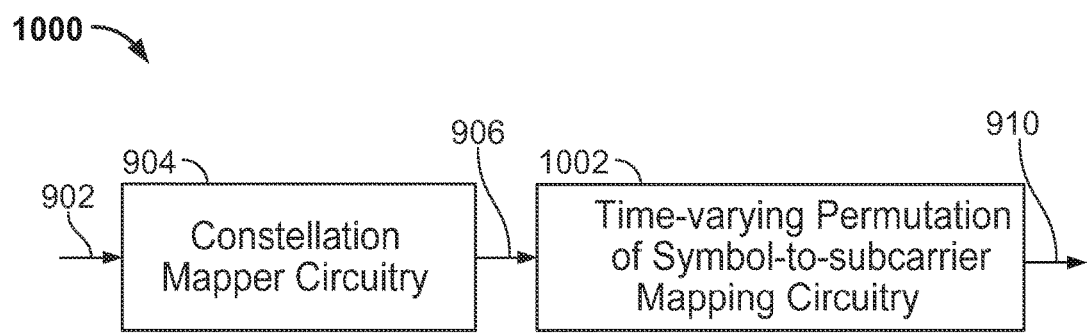
FIG. 10 shows a schematic representation of the inputs and outputs of the circuitry of a time-varying permutation of a symbol-to-subcarrier mapping block in accordance with an embodiment of the present disclosure.

Another example embodiment of the application of time diversity in a wireless transmitter is shown in FIG. 10, which illustrates a schematic representation of inputs and outputs of a symbol-to-subcarrier mapper with a time-varying permutation dependency, 1002. FIG. 9 illustrates a schematic representation of inputs and outputs of an existing symbol-to-subcarrier mapper 908. The encoded bit stream 902 is received at the constellation mapper 904 from either a BCC interleaver, for example, 506, or in some embodiments, from a low-density parity check (LDPC) interleaver. The constellation mapper 904 converts the bit stream to the QAM symbol stream 906, which is received at 908, in which modulated symbols will be mapped to each subcarrier and for each OFDM symbol. Here, a time-independent mapping is used in existing implementations. In the case of a system implementing a BCC encoder, an in-order mapping is applied. For example, the first symbol is assigned to the first subcarrier and the second symbol is assigned to the second subcarrier. In an embodiment where an LDPC encoder is currently used, a random static mapping is applied, wherein the symbols are permuted in the same manner for each OFDM symbol, and for every packet. In order to introduce time diversity to the symbol-to-subcarrier mapping block 908, a time-varying symbol-to-subcarrier mapping can be added to implementations using BCC encoders and to implementations using LDPC encoders. In both cases, the symbol-to-subcarrier mapping becomes time-dependent.

Figure 11:
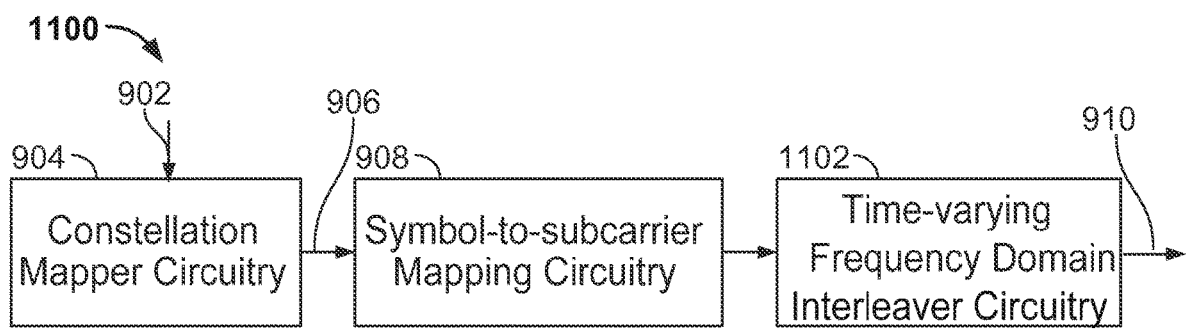
FIG. 11 shows a schematic representation of the inputs and outputs of the circuitry of a symbol-to-subcarrier mapper connected to the circuitry of a time-varying frequency domain interleaver in accordance with an embodiment of the present disclosure.

Two example time-dependent subcarrier mapping block implementation approaches are described below. In the first example approach, the time-varying permutation is added to block 908, and the resultant block is depicted as time-varying permutation of symbol-to-subcarrier mapping block 1002 in FIG. 10. In the second example approach, a time-varying frequency domain interleaver block 1102 is added after the symbol-to-subcarrier mapping block 908 in FIG. 11. Both examples are described in further detail under the assumption that the system operates using an LDPC encoder; however, the disclosure applies in cases where an BCC encoder is implemented.

Currently, when an LDPC encoder is used, the modulated symbols are mapped to a frequency by 908.

$$d'_{k,l,n} = d_{t(k),l,n}$$

$$t(k) = D_{TM}\cdot \left(k\bmod \frac{N_{SD}}{D_{TM}}\right) + \left\lfloor \frac{k\cdot D_{TM}}{N_{SD}} \right\rfloor$$

$$k = 0 \cdots N_{SD}-1, l=1, \ldots, N_{SS}, n = 0, \ldots, N_{SYM}-1;$$

Here, $d_{k,l,n}$-tilde is defined as output of the tone-mapping procedure, $D_{TM}$ is defined as the separation distance of subcarriers, l is defined as the index of spatial streams, and n is defined as the index of OFDM symbols. The mapping is implemented per each OFDM symbol, and, in turn, it is inherently constant over each transmission. The time-varying permutation of 1002 can be used in the case of LDPC to introduce time diversity. Therefore, the mapping varies per transmission, and potentially, it can vary in a different manner for each spatial stream. $d_{k,l,n}$-tilde is re-defined as:

$$d'_{k,l,n} = d_{t(k,T,l),l,n}$$

$T=0 \ldots N_{transmission}$, $k=0 \ldots N_{SD}-1$, $l=1, \ldots, N_{SS}$, $n=0, \ldots, N_{SYM}-1$;

In one example embodiment, the subcarrier mapper only varies in the same way for each spatial stream. Here, $N_{try}$ is defined as the number of retransmissions:

$$d'_{k,l,n} = d_{t(k,T),l,n}$$

$T=1 \ldots N_{try}$, $k=0 \ldots N_{SD}-1$, $l=1, \ldots, N_{SS}$, $n=0, \ldots, N_{SYM}-1$;

In another example embodiment, the mapper is rotated or shifted by a fraction of the bandwidth for each transmission. Here, $\Delta_{LDPC}^{i_{ss}}$ is defined as the offset for the $i_{ss}$-th stream.

$$t(k, T) = \left(D_{TM}\cdot \left(k\bmod \frac{N_{SD}}{D_{TM}}\right) + \left\lfloor \frac{k\cdot D_{TM}}{N_{SD}} \right\rfloor + T\cdot \Delta_{LDPC}^{i_{ss}}\right)\bmod N_{SD}$$

In a final example embodiment of 1002, the interleaver rows are swapped, depending on the time T, as follows:

$$t(k, T) = D_{TM} \cdot \left(k \bmod \frac{N_{SD}}{D_{TM}}\right) + f^{(i_{SS})}\left(\left\lfloor \frac{k \cdot D_{TM}}{N_{SD}} \right\rfloor, T\right)$$

To achieve this, three example methods are further disclosed. In the first example method, a table can be provided for the function f above. A second example method permits for the cyclical shift of rows:

$$t(k, T) = D_{TM} \cdot \left(k \bmod \frac{N_{SD}}{D_{TM}}\right) + \left(\left\lfloor \frac{k \cdot D_{TM}}{N_{SD}} \right\rfloor + \Delta_{ROW,LDPC}^{iss} \cdot T\right) \bmod D_{TM}$$

$\Delta_{ROW,LDPC}^{iss}$ is defined as the row offset for the iss-th stream. Finally, a third example method allows for the flipping of the rows alternatively for each transmission:

$$t(k, 2T) = D_{TM} \cdot \left(k \bmod \frac{N_{SD}}{D_{TM}}\right) + \left\lfloor \frac{k \cdot D_{TM}}{N_{SD}} \right\rfloor$$

$$t(k, 2T+1) = D_{TM} \cdot \left(k \bmod \frac{N_{SD}}{D_{TM}}\right) + D_{TM} - \left\lfloor \frac{k \cdot D_{TM}}{N_{SD}} \right\rfloor$$

The second example approach of introducing time diversity in the operations of the symbol-to-subcarrier mapping block 908 is to introduce 1102 in order to scramble the original symbols across subcarriers. Accordingly, in this example approach, the modulated symbols are initially mapped to subcarriers:

$$d'_{k,l,n} = d_{t(k),l,n}$$

$$t(k) = D_{TM} \cdot \left(k \bmod \frac{N_{SD}}{D_{TM}}\right) + \left\lfloor \frac{k \cdot D_{TM}}{N_{SD}} \right\rfloor$$

$$k = 0 \cdots N_{SD} - 1, l = 1, \ldots, N_{SS}, n = 0, \ldots, N_{SYM} - 1;$$

Next, the symbols mapped over the subcarriers are interleaved.

$$d''_{k,l,n} = d'_{s(k,T,l),l,n}$$

$$k = 0 \ldots N_{SD}-1, l=1, \ldots, N_{SS}, n=0, \ldots, N_{SYM}-1,$$

Here, $d_{k,l,n}$-double-tilde is defined as the output of the interleaving.

Figure 12:
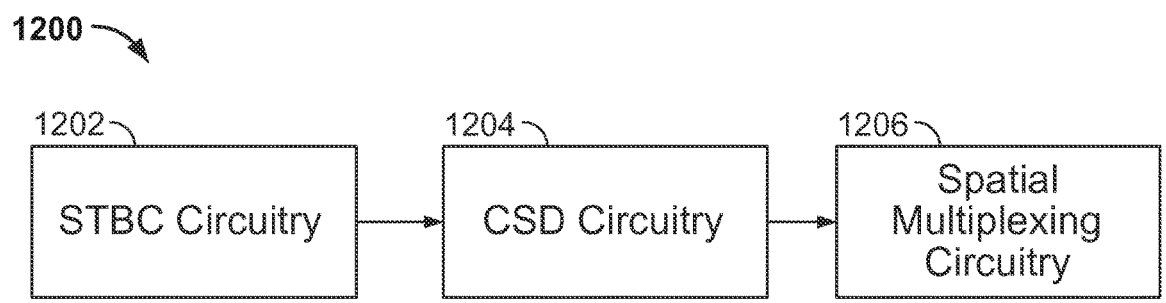
FIG. 12 shows a schematic representation of the inputs and outputs of the circuitry of a CSD block in accordance with an embodiment of the present disclosure.

A final example embodiment of the application of time diversity in a wireless transmitter is shown in FIG. 12, which depicts the input and output of a cyclic shift insertion (CSD) block. In current WiFi transmitters, cyclic shift is used to introduce frequency diversity. A unique time shift in the time or linear phase in frequency domain is added for each antenna. For example, the data field can be transmitted as $$r_{Field}^{(i_{TX})}(t) = \frac{1}{\sqrt{N_{SS} \cdot N_{Field}^{Tone}}}$$

$$\sum_{k=-N_{SR}}^{N_{SR}} \sum_{i_{SS}=1}^{N_{SS}} [Q_k]_{i_{TX},i_{SS}} X_k^{iss} \times \exp\left(j2\pi k \Delta_F \left(t - T_{GI}^{Field} - T_{CS}^{iss}\right)\right)$$

Here, $r_{Field}^{i_{TX}}$ is defined as the time domain signal of the $i_{TX}$-th transmit antenna for a given field at time t, $N_{Field}^{Tone}$ is defined as the number of tones for a given field, $N_{SR}$ is defined as the highest data subcarrier index per frequency segment, $Q_k$ is defined as the spatial mapping matrix for the k-th data subcarrier, $X_k^{iss}$ is defined as the data symbol for the $i_{SS}$-th spatial stream at the k-th data subcarrier, $T_{GI}^{Field}$ is defined as the guard interval duration for a given field, $T_{CS}^{iss}$ is defined as the cyclical delay value for the $i_{SS}$-th spatial stream, $i_{TX}$ is defined as the index of the transmit antenna, and $\Delta_F$ is defined as tone spacing. The time shift $T_{CS}$ for a spatial stream i is configured by the transmitter. In order to introduce time diversity, the time shift can be changed across transmissions, as follows:

$$r_{Field}^{(i_{TX})}(t) = \frac{1}{\sqrt{N_{SS} \cdot N_{Field}^{Tone}}}$$

$$\sum_{k=-N_{SR}}^{N_{SR}} \sum_{i_{SS}=1}^{N_{SS}} [Q_k]_{i_{TX},i_{SS}} X_k^{iss} \times \exp\left(j2\pi k \Delta_F \left(t - T_{GI}^{Field} - T_{CS}^{iss}(t)\right)\right)$$

A time-dependent time shift can be achieved by re-ordering the antennas in a time-dependent manner. The ordering is defined by the following T function:

$$T_{CS}^{iss}(t) = T_{CS}^{m(i_{SS},t)}$$

$$\{m(1, t), \ldots, m(N_{SS}, t)\} \in \{\Gamma_1, \Gamma_2, \ldots, \Gamma_L\} \; L \leq N_{SS}!$$

As another example, the time-dependent time shift can be rotated across the antennas. The ordering then becomes:

$$T_{CS}^{iss}(t) = (T_{CS}^{iss}(t-1) + \Delta_{CS}^{iss}) \bmod T_{max}^{iss}$$

$\Delta_{CS}^{iss}$ is defined as the offset of CSD values for the iss-th spatial stream and $T_{max}^{iss}$ is defined as the largest value of CSD values for the iss-th spatial stream. Finally, as a last example, the time-dependent time shift can be achieved by incrementing (and rotating) the linear phase:

$$T_{CS}^{iss}(t) = (T_{CS}^{iss}(t-1) + \Delta_{CS}^{iss}) \bmod T_{max}^{iss}$$

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for introducing time diversity in a transmitter, the method comprising:
   receiving a request to retransmit data, wherein the request indicates a retransmission number;
   obtaining a plurality of bits;
   parsing the plurality of bits into a plurality of streams, wherein the plurality of streams occupies a bandwidth, and wherein the bandwidth is 160 MHz or two 80-Mhz bandwidths;
   when the bandwidth is 160 MHz, allocating the plurality of streams into two 80-MHz frequency segments;
   encoding the plurality of streams into a plurality of symbols;
   mapping the plurality of symbols to a respective plurality of tones by shifting, based on the retransmission number and a stream offset, the mapping by a fraction of the bandwidth, wherein the mapping is time-varying;
   generating, based on the time-varying mapping, a plurality of time-domain signals; and
   transmitting the plurality of time-domain signals.

2. The method for introducing time diversity of claim 1, wherein parsing the plurality of bits into the plurality of streams comprises:
   determining, based on the retransmission number, an ordering of the plurality of streams across time;
   assigning the plurality of bits to respective plurality of bit blocks;
   generating, based on the respective plurality of bit blocks, the plurality of streams; and
   ordering, based on the ordering of the plurality of streams across time, the plurality of streams.

3. The method for introducing time diversity of claim 1, wherein, when the bandwidth is 160 MHz, allocating the plurality of streams into two 80-MHz frequency segments comprises:
   determining, based on the retransmission number, an ordering of the two 80-MHz frequency segments across time;
   assigning a plurality of bit blocks to an 80-MHz frequency segment of the two 80-MHz frequency segments, wherein the plurality of bit blocks is from the plurality of streams;
   generating, based on the assignment, the two 80-MHz frequency segments; and
   ordering, based on the ordering of the two 80-MHz frequency segments across time, the two 80-MHz frequency segments.

4. The method for introducing time diversity of claim 1, further comprising splitting, based on the retransmission number, the plurality of bits into a respective plurality of encoder parsers.

5. The method for introducing time diversity of claim 1, further comprising time-shifting, based on the retransmission number, the mapped plurality of symbols.

6. A system for introducing time diversity in a transmitter, the system comprising:
   control circuitry coupled to a transmitter configured to:
      receive a request to retransmit data, wherein the request indicates a retransmission number;
      obtain a plurality of bits;
      parse the plurality of bits into a plurality of streams, wherein the plurality of streams occupies a bandwidth, and wherein the bandwidth is 160 MHz or two 80-Mhz bandwidths;
      when the bandwidth is 160 MHz, allocate the plurality of streams into two 80-MHz frequency segments;
      encode the plurality of streams into a plurality of symbols;
      map the plurality of symbols to a respective plurality of tones by shifting, based on the retransmission number and a stream offset, the mapping by a fraction of the bandwidth, wherein the mapping is time-varying; and
      generate, based on the time-varying mapping, a plurality of time-domain signals; and
   the transmitter configured to:
      transmit the plurality of time-domain signals.

7. The system for introducing time diversity of claim 6, wherein the control circuitry is configured to parse the plurality of bits into the plurality of streams by:
   determining, based on the retransmission number, an ordering of the plurality of streams across time;
   assigning the plurality of bits to respective plurality of bit blocks;
   generating, based on the respective plurality of bit blocks, the plurality of streams; and
   ordering, based on the ordering of the plurality of streams across time, the plurality of streams.

8. The system for introducing time diversity of claim 6, wherein, when the bandwidth is 160 MHz, the control circuitry is configured to allocate the plurality of streams into two 80-MHz frequency segments by:
   determining, based on the retransmission number, an ordering of the two 80-MHz frequency segments across time;
   assigning a plurality of bit blocks to an 80-MHz frequency segment of the two 80-MHz frequency segments, wherein the plurality of bit blocks is from the plurality of streams;
   generating, based on the assignment, the two 80-MHz frequency segments; and
   ordering, based on the ordering of the two 80-MHz frequency segments across time, the two 80-MHz frequency segments.

9. The system for introducing time diversity of claim 6, the control circuitry further configured to split, based on the retransmission number, the plurality of bits into a respective plurality of encoder parsers.

10. The system for introducing time diversity of claim 6, the control circuitry further configured to time-shift, based on the retransmission number, the mapped plurality of symbols.

* * * * *